Patented June 15, 1937

2,084,042

UNITED STATES PATENT OFFICE 2,084,042

RUBBER DERIVATIVES

Thomas C. Morris, Akron, Ohio, assignor to Wingfoot Corporation, Wilmington, Del., a corporation of Delaware No Drawing. Application July 10, 1935, Serial No. 30,731

10 Claims. (Cl. 260—1)

This invention relates to the treatment of rubber in solution with a halide of an amphoteric metal. More particularly it relates to such a treatment carried out at a high temperature. The invention will be described more particularly as applied to the treatment of a benzene rubber cement with tin tetrachloride although other solvents for the rubber may be employed, and the treatment of rubber cements with other halides of amphoteric metals, for example ferric chloride, boron fluoride, stannous chloride, titanium tetrachloride, etc., is advantageously carried out at a high temperature.

In the commercial treatment of rubber solutions with tin tetrachloride various difficulties have been encountered. With all halides of amphoteric metals the gelation of the reaction mixture which prevents adequate agitation and smooth handling is to be prevented. The presence of oxygen even in small amounts increases the tendency to gel. With the tin tetrachloride reaction and other reactions involving the use of a halide of amphoteric metal all oxygen in the rubber cement is advantageously eliminated by boiling the cement and adding the reagent at or near the boiling point. With tin tetrachloride it has been found that if a benzene cement is used and the cement is heated to a temperature at or near the boiling point before the tin tetrachloride is added and the tin tetrachloride is then added to the heated cement, the action proceeds smoothly. Although shortly after the addition of the tin tetrachloride there is a tendency to gel the reaction rapidly progresses through this stage and then proceeds smoothly.

With a benzene rubber cement containing up to 15.0% of rubber the reaction can successfully be carried out on a commercial scale by employing up to 9.0% of tin tetrachloride. Cements containing smaller percentages of rubber may be employed and the amount of tin tetrachloride used with a cement of any specified rubber content may vary.

The gelation of reaction mixtures of this type is not thoroughly understood. With different solvents the tendency to gel differs. However, with any solvent heating avoids or minimizes gelation and if a benzene rubber cement is heated to eliminate oxygen and then the tin tetrachloride is added, objectionable gelation may be prevented if the reaction mixture is kept sufficiently hot. A temperature of 160° F. or preferably about 170° F. or higher will ordinarily be found satisfactory. Benzene boils at about 174° F. With a benzene solution the most advantageous results have been obtained by heating the benzene rubber cement to a temperature of 170° F. or higher before adding the tin tetrachloride although even if the benzene rubber cement is heated only to 160° F. certain advantages are realized.

In carrying out the tin tetrachloride reaction on a benzene or other rubber cement without first heating the cement to a high temperature it was found that the time required to effect any desired reaction of the tin tetrachloride on the rubber varied considerably from batch to batch. By first heating the rubber cement to a temperature near the boiling point it was found that the reaction was completed in a much shorter time and the time required was more uniform from batch to batch. This is true with the action of other halides of other amphoteric metals on benzene rubber cements and cements made with other solvents.

The production of condensation derivatives of rubber from rubber cements using halides of amphoteric metals as the condensing agent proceeds in two steps. In the first step a metallic addition compound is formed in which both the metal and halide appear to add onto the rubber at a double bond. On treating this metallic addition compound with water, alcohol or acetone the metal and halide split off from the hydrocarbon skeleton and a condensation derivative is obtained which is less unsaturated than the rubber. By first heating the rubber cement to a high temperature before adding the halide of an amphoteric metal it is found that in most cases the condensation derivative ultimately produced is much lighter in color than if the metallic halide has been allowed to react on the rubber cement at a lower temperature, and therefore necessarily for a longer time.

The nature of the condensation derivative obtained depends upon the extent to which the halide of the amphoteric metal reacts on the rubber. By proper regulation of this step a condensation derivative of higher or lower softening point may be obtained as described.

The reaction may advantageously be carried out on a commercial scale in any steam heated vessel equipped with suitable agitating means. A Day mixer has been found to give satisfactory results. The mixer is equipped with a reflux condenser containing a water trap to separate out any water that is returned from the condenser. The following example illustrates the process.

Two hundred and fifty pounds of pale crepe rubber are plasticized to a plasticity of about 300 as measured by a Williams plastometer and then dissolved in 307 gallons of commercial benzene. This cement is charged into a Day mixer of 500 gallons capacity or other suitable apparatus such as a Dopp kettle. Steam is introduced into the jacket of the mixer and the agitator is operated at about 20 R. P. M. In this way the rubber cement is heated to 160° F. or preferably somewhat higher before the tin tetrachloride is added. According to a preferred method of operation the cement is heated to a temperature of 170° F. or boiling and then the steam is shut off from the jacket and hot water at 180° F. is circulated through the jacket and 17.5 pounds of tin tetrachloride are stirred into the cement without admitting any air to the apparatus. The action of the tin tetrachloride on the rubber is exothermic and develops sufficient heat to keep the reaction mixture at or near the boiling point for 1½ hours or two hours or as long as is required to produce the desired reaction of the tin tetrachloride on the rubber. The reflux from the condenser is cold and therefore it is found desirable to circulate hot water at 180° F. through the jacket of the mixer to prevent the reaction mixture from being cooled below the reaction temperature.

The reaction conditions required to produce a desired reaction product will vary somewhat from batch to batch. The time required for the action of tin tetrachloride on a hot benzene rubber cement to produce a reacted cement with a viscosity of 1.05 cm. per second as measured by a Gardner mobilometer, in one instance was 1 hour and 44 minutes. In general the reaction time for producing such a reaction mixture with such a viscosity by the process given in detail above will vary from about 1 hour and 15 minutes to 1 hour and 45 minutes. To produce a viscosity of 0.75 cm. per second the reaction time in general will be from 1 hour to 1 hour and 30 minutes. When a reaction mixture of the desired viscosity has been obtained the reaction mixture is preferably dropped through the bottom of the reactor into a large volume of water in order to immediately terminate the reaction and in order to break down the tin chloride addition product which has been formed. A reducing agent such as sodium sulfite may advantageously be added to the water. Instead of dumping the reaction mixture into a large volume of water the reaction may be terminated by adding two or three gallons of water to the reactor and then the reaction mixture may be filtered before adding it to sufficient water to break down the tin chloride addition product.

Close observation of such a reaction shows that very soon after the tin tetrachloride has ben added to the cement the reaction mixture stiffens but for only a brief period and then the viscosity drops so that the reaction mixture can easily be agitated and the reaction allowed to progress smoothly until the desired product is obtained. This indicates that even in such a reaction a certain amount of gelling occurs, but there is not sufficient gelling to interfere with carrying out the process on a commercial scale. Apparently some complex product is formed by the reaction which causes the gelation but this is almost immediately broken down and the reaction proceeds smoothly. By heating the cement to a high temperature before adding the tin tetrachloride a relatively concentrated cement, such as that above mentioned, may be employed in commercial production without encountering such severe gelation as to prevent the smooth progress of the reaction.

Other halides of amphoteric metals may be made to act on rubber similarly, if conditions are so regulated as to prevent gelation. With a compound such as ferric chloride substantially the same temperature conditions may be employed as set forth in the above example, using 12.5 pounds of ferric chloride to 250 pounds of rubber dissolved as cement. With such a compound the reaction product and the condensation derivative obtained by adding water to the reacted mixture are dark in color due to the color of the ferric hydrated compounds formed.

With other solvents than benzene the reaction conditions may vary somewhat but the temperature of pre-heat required to prevent gelation and to promote a smooth reaction may be readily determined. Instead of benzene such solvents as chloroform, carbon tetrachloride, toluene and xylene may be used.

Although the invention has been described more particularly as applied to the treatment of pale crepe rubber it applies to other rubbers such as smoked sheet, guayule, etc. and may be employed in the treatment of gutta percha and balata. Furthermore the reaction may be varied to produce other condensation derivatives of rubber than the hydrocarbon obtained by the reaction given in the specific example as by adding other reagents such as HCl etc. to the reaction mixture. In such cases the HCl may be added to the heated rubber cement and the heating may continue to remove all traces of water before adding the tin tetrachloride.

I claim:

1. The method of treating rubber with the halide of an amphoteric metal which comprises heating a rubber cement to a temperature of at least 160° F. to eliminate air from the cement and reaction vessel and then while the cement is at a temperature of at least 160° F. adding the halide of an amphoteric metal thereto.

2. The method of treating rubber with the halide of an amphoteric metal which comprises treating a rubber cement with the halide of an amphoteric metal in the absence of air and maintaining the rubber cement at a temperature of at least 160° F. throughout the reaction.

3. The method of treating rubber with tin tetrachloride which comprises heating a benzene rubber cement under a reflux to a temperature of at least 160° F. to remove all air from the cement and reaction vessel and then adding tin tetrachloride to the cement while at a temperature above 160° F.

4. The method of treating a benzene rubber cement with tin tetrachloride which comprises carrying out the reaction from start to finish at a temperature above 160° in the absence of air.

5. The method of treating a benzene rubber cement with tin tetrachloride which comprises heating the benzene rubber cement under a reflux to substantially the boiling point and adding tin tetrachloride to the cement at substantially the boiling point while excluding air.

6. The method of treating rubber with tin tetrachloride which comprises heating a benzene solution of rubber containing as much as fifteen per cent by weight of rubber under a reflux condenser to practically the boiling point and then adding not more than 9.0 parts of tin tetrachloride calculated on the rubber content of the cement while the rubber cement is at substantially the boiling point.

7. The method of treating rubber with tin tetrachloride which comprises heating 100 parts of a benzene rubber cement containing substantially 12.5 per cent of rubber to approximately the boiling point and then while excluding air from the reaction mixture adding 0.875 part of tin tetrachloride while the reaction mixture is maintained at substantially the boiling point.

8. The method of treating rubber with the halide of an amphoteric metal which comprises heating a rubber cement under a reflux condenser to drive out air from the cement and the reaction mixture and thereafter adding the halide of an amphoteric metal to the heated cement while maintaining the reaction mixture at a sufficiently high temperature to prevent undesirable gelation during the reaction of the metallic halide on the rubber.

9. The method of treating rubber with the halide of an amphoteric metal and hydrochloric acid which comprises heating a rubber cement with the hydrochloric acid under a reflux condenser to drive out air from the cement and trapping out water from the refluxed solvent which is returned to the cement and then adding the halide of an amphoteric metal to the reacted cement while maintaining the reaction mixture at a sufficiently high temperature to prevent undesirable gelation during the reaction of the metallic halide on the rubber.

10. The method of treating rubber with tin tetrachloride which comprises heating a benzene solution of rubber containing as much as 15% by weight of rubber under a reflux condenser to practically the boiling point and then adding tin tetrachloride to the resulting rubber cement while it is at substantially the boiling point.

THOMAS C. MORRIS.